US009367212B2

(12) United States Patent
Mesguich Havilio

(10) Patent No.: US 9,367,212 B2
(45) Date of Patent: Jun. 14, 2016

(54) USER INTERFACE FOR NAVIGATING PAGINATED DIGITAL CONTENT

(71) Applicant: BARNES & NOBLE COLLEGE BOOKSELLERS, LLC, Basking Ridge, NJ (US)

(72) Inventor: Amir Mesguich Havilio, Palo Alto, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 131 days.

(21) Appl. No.: 14/144,875

(22) Filed: Dec. 31, 2013

(65) Prior Publication Data

US 2015/0185981 A1 Jul. 2, 2015

(51) Int. Cl.
| | |
|---|---|
| G06F 3/048 | (2013.01) |
| G06F 3/0483 | (2013.01) |
| G06F 3/0488 | (2013.01) |
| G06F 3/0489 | (2013.01) |
| G06F 3/0484 | (2013.01) |

(52) U.S. Cl.
CPC .......... *G06F 3/0483* (2013.01); *G06F 3/04847* (2013.01); *G06F 3/04883* (2013.01); *G06F 3/04886* (2013.01); *G06F 3/04895* (2013.01)

(58) Field of Classification Search
None
See application file for complete search history.

(56) References Cited

U.S. PATENT DOCUMENTS

| | | | |
|---|---|---|---|
| 4,763,356 A * | 8/1988 | Day, Jr. ................ | G06F 3/0488 178/18.01 |
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,334,157 B1 | 12/2001 | Oppermann et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |

(Continued)

FOREIGN PATENT DOCUMENTS

EP 0722150 A1 7/1996

OTHER PUBLICATIONS

MobileDevCK, "FAQ: How to go to a specific page", Jun. 27, 2013, https://forums.adobe.com/docs/DOC-3342.*

(Continued)

*Primary Examiner* — Jeffrey A Gaffin
*Assistant Examiner* — Nhat-Huy T Nguyen
(74) *Attorney, Agent, or Firm* — Finch & Maloney PLLC

(57) ABSTRACT

Techniques are disclosed for navigating pages of paginated digital content (e.g., an eBook), referred to herein as a go-to mode. The go-to mode may include a page number input field and a keypad. The keypad, which may be presented in response to a reveal command (e.g., tapping on the input field), can be used to provide numerical input to the input field and allow a user to navigate to the input page number. The go-to mode may be configured to disable keys on the keypad when selection of one of the keys would result in an invalid input in the input field. The go-to mode may also be configured to update which keys are disabled and/or enabled when a cursor position in the input field is changed, contents in the input field are selected, or a number is input into or deleted from the input field.

20 Claims, 11 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0006117 | A1* | 1/2002 | Duske, Jr. .......... H04B 7/18567 370/316 |
| 2002/0116421 | A1 | 8/2002 | Fox et al. |
| 2003/0004874 | A1* | 1/2003 | Ludwig ................ G06Q 20/102 705/40 |
| 2007/0047002 | A1 | 3/2007 | Hull et al. |
| 2008/0036747 | A1 | 2/2008 | Hope |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0166544 | A1* | 7/2011 | Verhoef .............. A61M 5/1413 604/500 |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |

OTHER PUBLICATIONS

Joey Piccola, "Windows Form, have button return to disabled if text box is empty", Jan. 8, 2013, https://social.technet.microsoft.com/Forums/windowsserver/en-US/ffbb7eda-a2df-4786-94cb-3b4cd1359cb5/windows-form-have-button-return-to-disabled-if-text-box-is-empty.*
"Adonit Jot Touch (for iPad)," Adonit Jot Touch (for iPad) Review & Rating—PCMag.com; http://www.pcmag.com/article2/0,2817,2411192,00.asp; printed from the Internet on Jun. 20, 2013, 6 pages.
Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.
"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9/10/04, 10 pages.
"Pen," DuoSense Pen, N-trig Hands-on computing, http://www.n-trig.com/Content.aspx?Page=DigitalPencil, printed from the Internet on Jun. 20, 2013, 3 pages.
"Easing functions," Easing Functions Cheat Sheet, http://easings.net/, printed from the Internet on Jun. 17, 2013, 3 pages.
Kirupa, Easing Functions (aka Timing Functions) in CSS3, http://www.kirupa.com/html5/easing_functions_css3.htm, published Apr. 3, 2013, 16 pages.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, printed from the Internet on Aug. 2, 2013, 5 pages.
"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.
"Future Apple Notebooks & Tablets may use Acoustic Commands—Patently Apple," http://www.patentlyapple.com/patently-apple/2011/02/future-apple-notebooks-tablets-may-use-acoustic-commands.html, published Feb. 18, 2011, 6 pages.
"Guidelines for selecting text and images (Windows Store apps)," http://msdn.microsoft.com/en-us/library/windows/apps/hh465334, printed from the Internet on Jun. 20, 2013, 5 pages.
Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.
"How do WACOM tablets work?," tablet4u.co.uk, http://www.tablet4u.co.uk/techinfo.html, printed from the Internet on Jun. 20, 2013, 2 pages.
Kim, Arnold, "Multi-Touch Page Flipping eBook Concept Shown on an iPad," http://www.macrumors.com/2012/01/23/multi-touch-page-flipping-ebook-concept-shown-on-an-ipad/, posted Jan. 22, 2012 at 10:52 PM, 6 pages.
"Desktop Touchscreens,"—Desktop touchscreens explained, http://www.touchscreenmagazine.nl/touchscreen-solutions/desktop-touchscreens, printed from the Internet on Nov. 3, 2012, 1 page.
"MTStylus Wireless Stereo Stylus for iPhone/Andriod Phone & Tablet," dexim-MTStylus Wireless Stereo Stylus, http://www.dexim.net/content.php?id=165&pid=11, printed from the Internet on Jun. 20, 2013, 2 pages.
"Padblue 2," BRANDO—mobile.brando.com, http://mobile.brando.com/Padblue-2_p9162c1577d94.html., printed from the Internet on May 10, 2013, 4 pages.
Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.
"Bluetooth 4.0 SmartPen The future just got a little brighter," Pogo Connect, http://tenonedesign.com/connect.php, printed from the Internet on Jun. 20, 2013, 7 pages.
Quick, Darren, "Pressure sensitive technology set to bring 3D capability to touchscreens," Mobile Technology, http://www.gizmag.com/new-touchscreen-technology, published on Jan. 31, 2010, 4 pages.
Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.
"Stylus Hanging Bluetooth Headset," BRANDO—mobile.brando.com, http://mobile.brando.com/prod_detail.php?prod_id=03291, printed from the Internet on May 10, 2013, 4 pages.

(56) References Cited

OTHER PUBLICATIONS

"The JukeStyle is a great budget stylus for your iOS devices," stylus Archives—iPad News, http://www.ipadnews.nl/tag/stylus/, printed from the Internet on Jun. 20, 2013, 44 pages.

Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.

Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267-8/11/05, pp. 403-412.

"Gesture Search for Google Mobile", Google Mobile, www.google.com/mobile/gesture-search, printed from the Internet on Dec. 26, 2012, 1 page.

"Comics by comiXology," Comic Book Reader Guide, http://www.comicbookreaderguide.com/comics-by-comixology/, printed from the Internet on May 6, 2013, 24 pages.

"NFC Forum: Frequently Asked Questions," http://www.nfc-forum.org/resources/faqs#acknowledge, printed from the Internet on Feb. 18, 2013, 11 pages.

"How to Remote Wipe an iPhone or iPad," OSXDaily, http://osxdaily.com/2012/06/05/remote-wipe-iphone-or-ipad/, published Jun. 5, 2012, 4 pages.

"Screen hotspot," Wikipedia, the free encyclopedia, http://en.wikipedia.org/wiki/Screen_hotspot, printed from the Internet on May 15, 2013, 1 page.

"PAiA-Touch Switches," copyright 2006 PAiA Corporation USA, http://www.paia.com/ProdArticles/touchsw.html, printed from the Internet on Aug. 27, 2013, 3 pages.

Kanai, et al., "Intra-Rendition Navigation," Copyright 2012-2013 International Digital Publishing Forum (IDPF), 13 pages.

"Explaining how the sPen tech works (and is very diff than other styluses)," http://forum.xda-developers.com/showthread.php?t=1439369, posted Jan. 11, 2012, 8:20 AM, 1 page.

"Navigation Drawer," http://developer.android.com/design/patterns/navigation-drawer.html, downloaded from the internet on Dec. 20, 2013, 14 pages.

\* cited by examiner

USER INTERFACE FOR NAVIGATING PAGINATED DIGITAL CONTENT

FIELD OF THE DISCLOSURE

This disclosure relates to electronic computing devices, and more particularly, to user interfaces (UI) and UI techniques for navigating paginated digital content on such devices.

BACKGROUND

Electronic computing devices such as tablets, eReaders, mobile phones, smart phones, personal digital assistants (PDAs), and other such devices are commonly used for displaying digital content. The content may be, for example, an eBook, a web page, an online article or blog, images, a movie or video, a map, just to name a few types. Such devices may also be useful for displaying a user interface that allows a user to interact with one or more applications running on the device. The applications may allow a user to read or browse through paginated digital content, such as electronic books (eBooks), magazines, catalogs, or comics, for example. The computing devices may also include a touch-sensitive surface/interface for receiving user input such as a touch screen or a track pad (e.g., in combination with a non-touch-sensitive display). The user may interact with such touch-sensitive electronic computing devices using fingers and/or a stylus, for example.

DETAILED DESCRIPTION

Figure 1A:
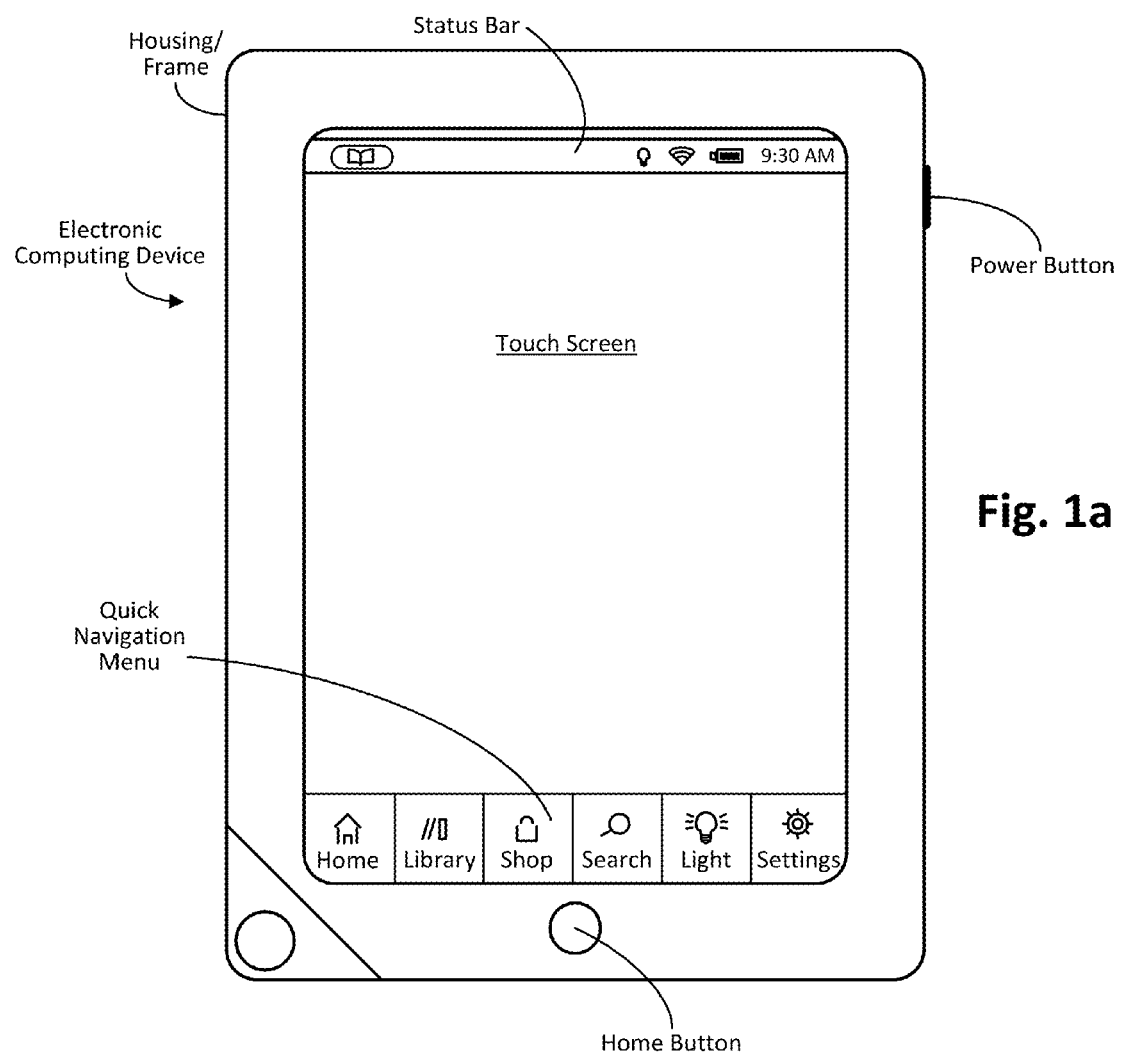
FIG. 1a illustrates an example electronic computing device, configured in accordance with one or more embodiments of the present invention.

Techniques are disclosed for navigating pages of paginated digital content (e.g., an eBook), referred to herein as a go-to mode. The go-to mode may include a page number input field and a keypad. The keypad, which may be presented in response to a reveal command (e.g., tapping on the input field), can be used to provide numerical input to the input field and allow a user to navigate to the input page number. The go-to mode may be configured to disable one or more keys on the keypad (sometimes referred to as a custom keypad herein) when selection of one of the keys would result in an invalid input in the input field. Such invalid input may be determined based on the cursor position in the input field (or whether the entry in the input field is selected) and/or based on the total number of pages of the paginated digital content being navigated. For example, invalid input for numeric keys may be determined as any input that would result in a page number that exceeds the total number of pages of the paginated digital content. The go-to mode may also be configured to update which keys are disabled and/or enabled when a cursor position in the input field is changed, contents in the input field are selected, or a number is input into or deleted from the input field. Numerous other configurations and variations will be apparent in light of this disclosure.

General Overview

As previously explained, electronic computing devices such as tablets, eReaders, and smart phones are commonly used for displaying user interfaces and digital content. The user of such devices can typically consume the displayed digital content with relative ease. In some instances, the content being consumed, such as electronic books (eBooks), magazines, catalogs, comics, or other digital documents, may be divided into individual pages. Some applications or user interfaces of the devices provide the ability to interact with such paginated content, including navigating to a desired page of the content. Conventional techniques for navigating to a desired page include, for example, navigating the content page-by-page or entering the desired page number in a customary text entry box. However, such conventional techniques may detract from the user experience or otherwise lead to a diminished user experience.

Thus, and in accordance with one or more embodiments of the present invention, techniques are disclosed for navigating pages of paginated digital content, referred to herein as a go-to mode. The go-to mode may be used with any paginated or similarly divided digital content such as, for example, eBooks, magazines, catalogs, comics, documents, notes, presentations, lecture materials, photo albums, and/or any other suitable paginated or similarly divided digital content. For example, the go-to mode may be used to navigate pages of an eBook or other electronic document, to navigate chapters of a video, to navigate tracks of a music album or playlist, or to navigate images in a photo album, just to name a few examples. The go-to mode will be primarily discussed herein with reference to navigating pages of an eBook for ease of description; however, the go-to mode is not intended to be so limited.

As will be apparent in light of this disclosure, the go-to mode can include a page number input field and a keypad. The keypad, in some embodiments, can be used to provide numerical input to the input field and thereby allow a user to navigate to the input page number. In some embodiments, the keypad includes numerical keys 0 through 9 (and an optional 00 key) configured to provide the corresponding numerical input when selected, and can also include other keys, such as a delete key configured to delete input when selected, a go/enter key configured to navigate to the input page number when selected, and/or left and right arrow keys configured to move a cursor in the input field when selected, just to name a few example keys. In some embodiments, a reveal command can be performed to invoke the go-to mode and/or cause the keypad (as well as, in some cases, the input field) to be presented/displayed. Examples of a reveal command may include tapping/selecting on the go-to mode input field, a multi-fingered gesture, and/or selecting a menu option or go-to mode button, just to name a few examples. In some embodiments, the go-to mode input field may always be presented/displayed, while in other embodiments, a user action may have to be performed to cause the input field to be presented (e.g., tapping/selecting on the paginated digital content to cause the input field to be presented).

Once the keypad is displayed (or otherwise presented), the entry in the input field (e.g., the page number of the page being currently displayed) may be preselected, in some embodiments, allowing a user to replace the entry in the input field. In some such embodiments, the user can tap again in the input field to pre-pend or append the numbers as well (or, in some embodiments, use arrow keys to move the input field cursor). The keypad may be referred to herein as a custom keypad, since (in some embodiments) the go-to mode may be configured to disable one or more keys on the custom keypad when selection of such keys would result in an invalid input in the input field. Such invalid input may be determined based on the cursor position in the input field (or whether the entry in the input field is selected) and/or based on the total number of pages of the paginated digital content being navigated. For example, in some embodiments, one or more of the numeric keys may be disabled when selection of one of such numeric keys would result in an invalid page number input in the input field based on the total number of pages of the paginated digital content. In some such example embodiments, invalid input may be determined as any input that would result in a page number that exceeds the total number of pages of the paginated digital content.

In addition, in some embodiments, the delete key (if the custom keypad includes such a key) may be disabled when there is no input in the input field or when the cursor is positioned at the beginning of the input (e.g., positioned at the leftmost position). Further, in some embodiments, the go/enter key (if the custom keypad includes such a key) may be disabled when there is no input in the input field or when a currently displayed page is in the input field. Other example cases will be discussed in more detail herein. Disabling a key may include making it non-selectable, and in some embodiments, may include an indication that one or more keys are non-selectable (e.g., making the keys darker, smaller, or hidden). In some embodiments, the go-to mode may be configured to dynamically update which keys are disabled and/or enabled when one or more of the following occurs: a cursor position in the input field is changed, the contents of the input field are selected, a number is input into the input field, or a number is deleted from the input field, just to name a few example actions that may cause the keypad to be dynamically updated. The go-to mode may stay invoked and/or the custom keypad may continue to be presented/displayed until a user selects the go/enter button, for example, to navigate to the input page number, or until some other suitable exit action is performed. Other suitable exit actions may include: tapping/selecting outside of the custom keypad and input field to return to the current page of the paginated digital content, selecting a back button, or selecting a home or power button on the device, just to name a few examples.

In some embodiments, the go-to mode may be configured at a global level (e.g., based on the UI settings of the device) and/or at an application level (e.g., based on the specific application being used to interact with the paginated digital content). For example, the mode may be configured to be enabled for some applications and disabled for others. To this end, one or more of the mode features may be user-configurable, hard-coded, or some combination thereof (e.g., where some aspects are user-configurable and others are hard-coded), as will be apparent in light of this disclosure. Further, the go-to mode may be included initially with the UI (or operating system) of an electronic computing device or be included in a separate program/service/application config-ured to interface with the UI of such a device to incorporate the functionality of the mode as variously described herein. In some embodiments, the mode may come in the form of a computer program product (one or more non-transient computer readable mediums) that includes a plurality of instructions non-transiently encoded thereon, that when executed by one or more processors, cause a process to be carried out that includes the functionality of the go-to mode as variously described herein.

As will be apparent in light of this disclosure, the go-to mode may be used on any suitable electronic computing device, such as various smartphones, tablets, and eReaders. In such devices including a touch-sensitive UI, user input may be referred to as contact or user contact for ease of reference. However, direct and/or proximate contact (e.g., hovering within a few centimeters of the touch-sensitive surface) may be used to provide user input to the device, depending on the specific touch-sensitive surface/interface being used. In other words, in some embodiments, a user need not even physically touch the device or its touch-sensitive surface/interface to provide input. Also note that the user contact (whether direct or proximate) may be provided by the user's hand (or another suitable body part), or a stylus (or some other suitable implement), for example. In some embodiments, user input may be provided in various other ways, such as through voice commands or sounds, or through any other suitable method. Numerous variations and configurations will be apparent in light of this disclosure.

Computing Device and Configuration Examples

FIG. 1a illustrates an example electronic computing device, configured in accordance with one or more embodiments of the present invention. The device could be, for example, a tablet such as the NOOK® tablet by Barnes & Noble®. In a more general sense, the device may be any computing device capable of displaying digital content, such as a smart phone, eReader, tablet computer, laptop, or desktop computer, for example. In some instances, the computing device may be touch-sensitive and include a touch screen display or a non-touch-sensitive display screen that can be used in conjunction with a touch-sensitive surface/interface, such as a track pad. As will be appreciated in light of this disclosure, the present disclosure is not intended to be limited to any particular kind or type of computing device. For ease of description, an example computing device is provided herein with touch screen technology.

As can be seen with the example embodiment shown in FIG. 1a, the device comprises a housing/frame that includes a number of hardware features such as a power button and a press-button (sometimes called a home button herein). A touch screen based user interface (UI) is also provided (although a computing device running the go-to mode as variously described herein need not be touch-sensitive), which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI touch or non-touch controls and features can be implemented using any suitable conventional or custom technology, as will be appreciated.

Although the computing device shown in FIG. 1a uses a touch screen display, other touch-sensitive embodiments may include a non-touch screen and a touch-sensitive surface such as a track pad, or a touch-sensitive housing configured with one or more acoustic sensors, etc. As previously described, the computing device need not be touch-sensitive and may receive input from physical buttons, directional pads, joysticks, mouse pointing devices, and physical keyboards, just to name a few other input device examples. Continuing with the example computing device shown in FIG. 1a, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used to display the device's home screen when the device is awake and in use. Note that the buttons as variously described herein may be physical, virtual, or some combination thereof, depending upon the embodiment. The home button (or other buttons) may also be used in conjunction with the go-to mode as disclosed herein to, for example, minimize the keypad after it has been presented to return to the paginated digital content. Numerous other configurations and variations will be apparent in light of this disclosure, and the present disclosure is not intended to be limited to any particular set of control features or device form factor.

Figure 1B:
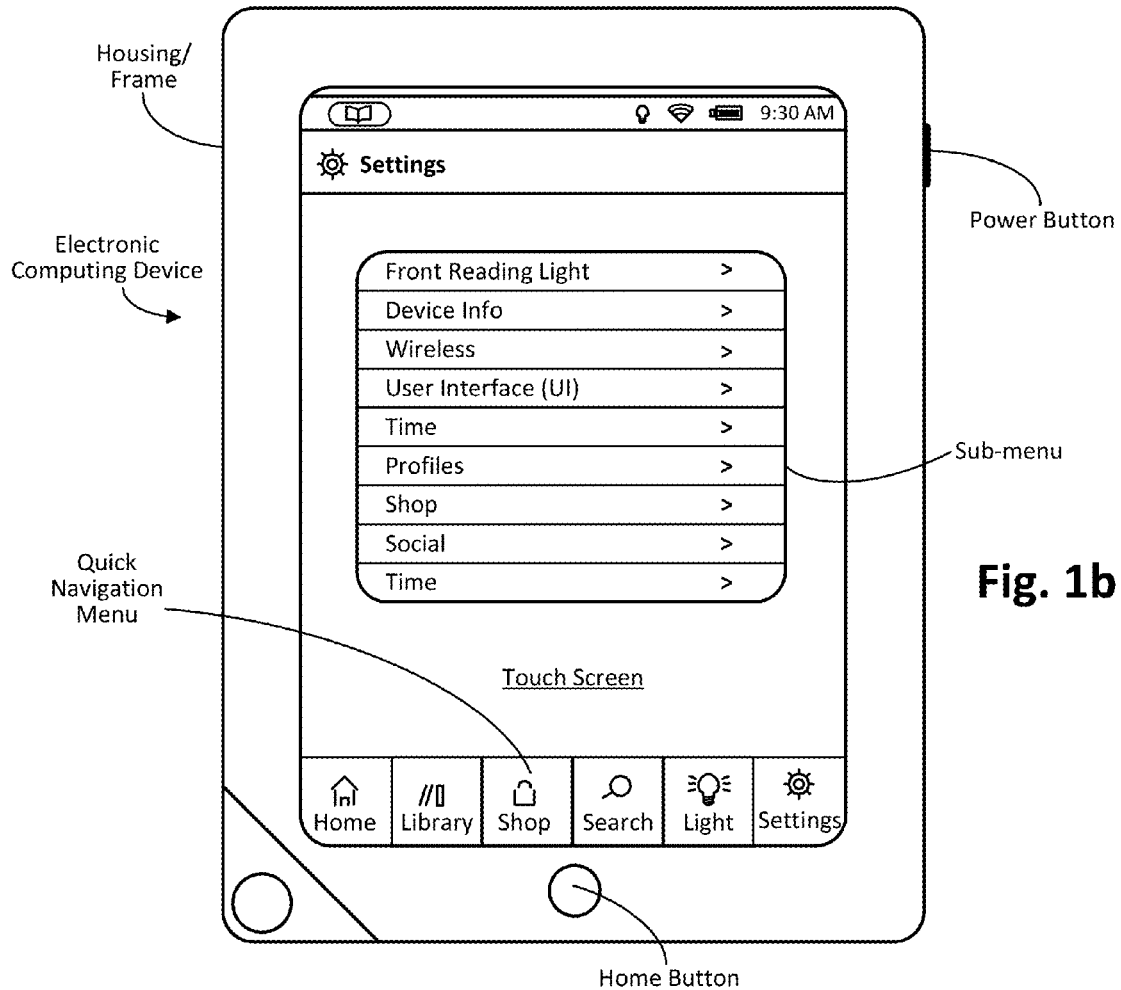
FIGS. 1b-c illustrate example configuration screen shots of the user interface of the computing device shown in FIG. 1a, in accordance with an embodiment of the present invention.
Figure 1C:
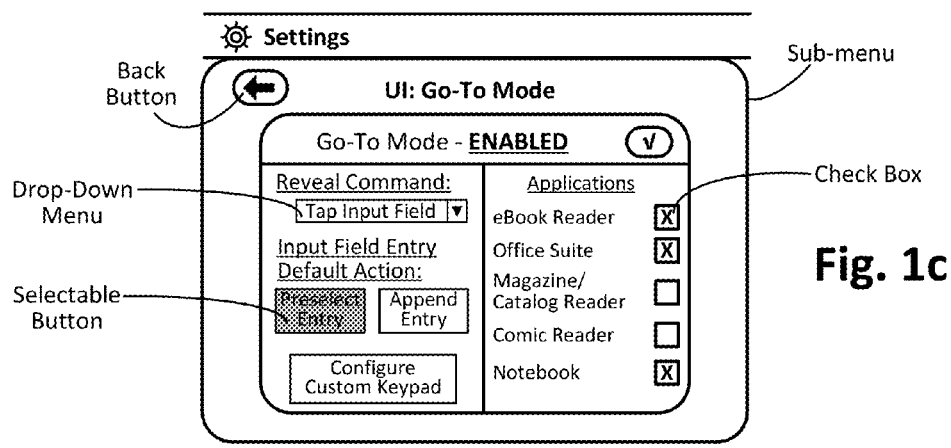

Continuing from FIG. 1a, the user can access a configuration sub-menu, such as the Go-To Mode configuration sub-menu shown in FIG. 1c, by tapping or otherwise selecting the Settings option in the quick navigation menu, which causes the device in this embodiment to display the general sub-menu shown in FIG. 1b. From this general sub-menu the user can select any one of a number of options, including one designated User Interface (UI) in this specific example case. Selecting this sub-menu item (with, for example, an appropriately placed screen tap) may cause the configuration sub-menu of FIG. 1c to be displayed, in accordance with an embodiment. In other example embodiments, selecting the User Interface (UI) option may present the user with a number of additional sub-options, one of which may include an eReader option, which may then be selected by the user so as to cause the configuration sub-menu of FIG. 1c to be displayed. Any number of such menu schemes and nested hierarchies can be used, as will be appreciated in light of this disclosure. In other embodiments, the go-to mode as described herein may be hard-coded such that no configuration is needed or otherwise permitted. The degree of hard-coding versus user-configurability can vary from one embodiment to the next, and the present disclosure is not intended to be limited to any particular configuration scheme of any kind, as will be apparent in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal, which is then received and processed by the underlying operating system (OS), system software, and circuitry (processor, etc.) of the computing device. In some instances, note that the user need not actually physically touch the touch-sensitive surface/interface to provide user input (e.g., when the touch-sensitive surface/interface recognizes hovering input). In embodiments where the computing device is not-touch-sensitive, input may be provided using a mouse, joystick, or directional pad, and one or more buttons, for example, to provide input similar to touching a touch screen. In some embodiments, the UI may allow other user interactions, such as voice-commands. Additional example details of the underlying OS and circuitry in accordance with some embodiments will be discussed in turn with reference to FIG. 2a. As previously explained, in some cases, the go-to mode as described herein may be automatically configured by the specific UI or application being used. In these instances, the mode need not be user-configurable (e.g., if the mode is hard-coded or are otherwise automatically configured).

Continuing with FIG. 1b, once the Settings sub-menu is displayed, the user can then select the User Interface (UI) option. In response to such a selection, the Go-To Mode configuration sub-menu shown in FIG. 1c can be provided to the user. In this example case, the configuration sub-menu includes a UI check box that when checked or otherwise selected by the user, effectively enables the mode (shown in the Enabled state); unchecking the box disables the mode. Other embodiments may have the go-to mode always enabled, while in other embodiments the mode may be enabled or disengaged by a physical switch or button, or by a uniquely identifiable gesture or screen contact, for example.

As can be seen in the example shown in FIG. 1c, the sub-menu includes a left section that allows a user to configure a number of options for the go-to mode and a right section that allows a user to enable/disable the go-to mode for various applications. The left section in this example of the sub-menu includes a configuration option that allows a user to select a Reveal Command using the corresponding drop-down menu. As shown, the reveal command is set as a Tap Input Field; however, the go-to mode may be configured with more than one reveal command and any suitable input may be used, as will be apparent in light of this disclosure. Other example reveal commands may include selecting the go-to mode input field (e.g., for non-touch-sensitive computing devices), a multi-fingered gesture (e.g., a three-fingered swipe gesture or any other suitable input), or invoking the go-to mode through one or more menu or button selections, just to name a few examples.

In some embodiments, the go-to mode input field may always be presented, such that a reveal command using the input field (e.g., the currently set Tap Input Field) may be performed at any time to cause the go-to mode keypad to be presented, thereby allowing a user to navigate to a desired page. In some embodiments (such as embodiments where the reveal command includes an interaction with the go-to mode input field), an initial command or action may have to be performed to cause the input field to be presented (e.g., before the reveal command can be performed). For example, the input field may be hidden to maximize the usable screen space and it may revealed in response to a tap performed on the paginated digital content, as will be discussed herein. In some embodiments, a single reveal command (e.g., a three-fingered swipe gesture or any other suitable input) may cause the go-to mode keypad and input field to be simultaneously presented. In some such embodiments, the input field may be a part of (or attached to) the keypad. Numerous variations and configurations will be apparent in light of this disclosure.

Continuing with the sub-menu shown in FIG. 1c, a configuration option related to the Input Field Entry Default Action is shown on the left side. This configuration option allows the user to set what the default action for the input field that can occur when a reveal command is performed, for example. As can be seen, two selectable options are available in this example sub-menu: Preselect Entry that, when set, causes the page number in the input field to be preselected in response to a reveal command; and Append Entry that, when set, causes the input field cursor to start at the end of the page number in the input field in response to a reveal command. The sub-menu also includes a Configure Custom Keypad selectable button that allows the user to configure the custom keypad, in this example embodiment. Customization options may relate to the custom keypad's size, color, shape, layout, or included keys, just to name a few examples. The go-to mode may include other customizable features or aspects, as will be apparent in light of this disclosure.

The right side of the example settings sub-menu screen shot shown in FIG. 1c includes an Applications section that allows a user to individually enable the go-to mode for specific applications, in this embodiment. Such a configuration feature may be helpful, for instance, in a tablet or laptop or other multifunction computing device that can execute different applications (as opposed to a computing device that is more or less dedicated to a particular application). As previously explained, in some embodiments, the go-to mode may be application specific or configured at an application level. As can be seen in the example screen shot shown in FIG. 1c, the mode is enabled for the eBook Reader, Office Suite, and Notebook applications. For completeness of description, the mode is disabled for the Magazine/Catalog Reader and the Comic Reader, in this example case, such that the mode may not be able to be invoked in those two applications to present the keypad as variously described herein. In some embodiments, the go-to mode may be later enabled from this settings screen or enabled from within a specific application. In some embodiments, the go-to mode may be related or tied to one or more specific applications of the device's UI (or operating system), such that the mode is only available, active, or running when such an application is available, active, or running. For example, the mode may only be available, active, or running when an eReader application is active and/or displayed, which may save a computing device's memory and/or power consumption. Any number of applications or device functions may benefit from the go-to mode as variously provided herein, whether user-configurable or not, and the present disclosure is not intended to be limited to any particular application or set of applications.

Figure 2A:
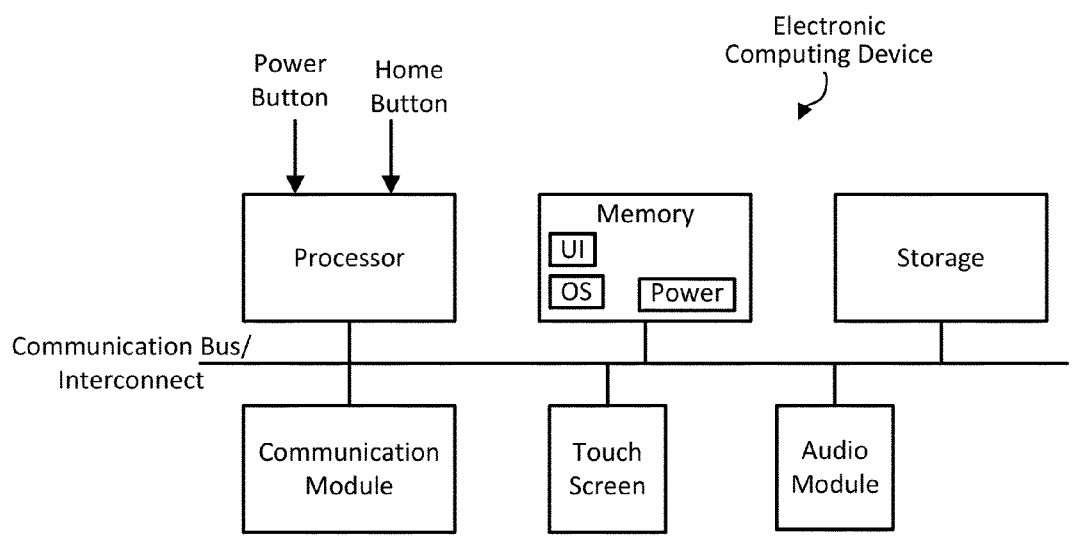
FIG. 2a illustrates a block diagram of an electronic computing device, configured in accordance with an embodiment of the present invention.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1b and 1c show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind Architecture FIG. 2a illustrates a block diagram of a computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). Further note that although a touch screen display is provided, other touch-sensitive embodiments may include a non-touch screen and a touch-sensitive surface such as a track pad, or a touch-sensitive housing configured with one or more acoustic sensors, etc. In this manner, a non-touch-sensitive computing device can become a touch-sensitive computing device by adding an interfacing touch-sensitive component. However, as previously explained, some embodiments may be non-touch-sensitive. The principles provided herein equally apply to any such computing device. For ease of description, examples are provided with touch screen technology.

The touch-sensitive surface (touch-sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch-sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device, including the go-to mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button, home button, and touch-sensitive surface. In other embodiments, the processor may be configured to receive input from other input devices, such as from a mouse or keyboard, for example, to determine if such devices are being used to provide input. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touch-sensitive interface technology. The communications module can be, for instance, any suitable 802.11 b/g/n WLAN chip or chip set, which allows for connection to a local network so that content can be downloaded to the device from a remote location (e.g., content provider, etc., depending on the application of the display device). In some specific example embodiments, the device housing or frame that contains all the various componentry measures about 7" to 9" high by about 5" to 6" wide by about 0.5" thick, and weighs about 7 to 8 ounces. Any number of suitable form factors can be used, depending on the target application (e.g., laptop, smart phone, etc.). The device may, for example, smaller for smart phone and eReader applications and larger for tablet computer applications.

The operating system (OS) module can be implemented with any suitable OS, but in some example embodiments is implemented with Google Android OS or Linux OS or Microsoft OS or Apple OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content. In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1a-c, 3a-j, and 4a-d, in conjunction with the methodology demonstrated in FIG. 5, which will be discussed in turn.

Client-Server System

Figure 2B:
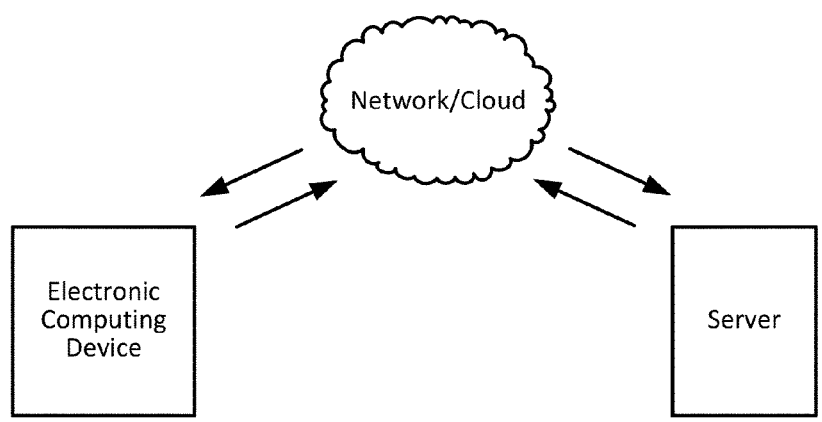
FIG. 2b illustrates a block diagram of a communication system including the electronic computing device of FIG. 2a, configured in accordance with an embodiment of the present invention.

FIG. 2b illustrates a block diagram of a communication system including the electronic computing device of FIG. 2a configured in accordance with an embodiment of the present invention. As can be seen, the system generally includes an electronic computing device that is capable of communicating with a server via a network/cloud. In this example embodiment, the computing device may be, for example, an eReader, a smart phone, a laptop, a tablet computer, a desktop computer, or any other suitable computing device. The network/cloud may be a public and/or private network, such as a private local area network operatively coupled to a wide area network such as the Internet. In this example embodiment, the server may be programmed or otherwise configured to receive content requests from a user via the computing device and to respond to those requests by providing the user with requested or otherwise recommended content. In some such embodiments, the server may be configured to remotely provision the go-to mode as variously provided herein to the computing device (e.g., via JavaScript or other browser based technology). In other embodiments, portions of the methodology may be executed on the server and other portions of the methodology may be executed on the device. Numerous server-side/client-side execution schemes can be implemented to facilitate the go-to mode as disclosed herein in accordance with one or more embodiments, as will be apparent in light of this disclosure.

Go-To Mode Examples

Figure 3A:
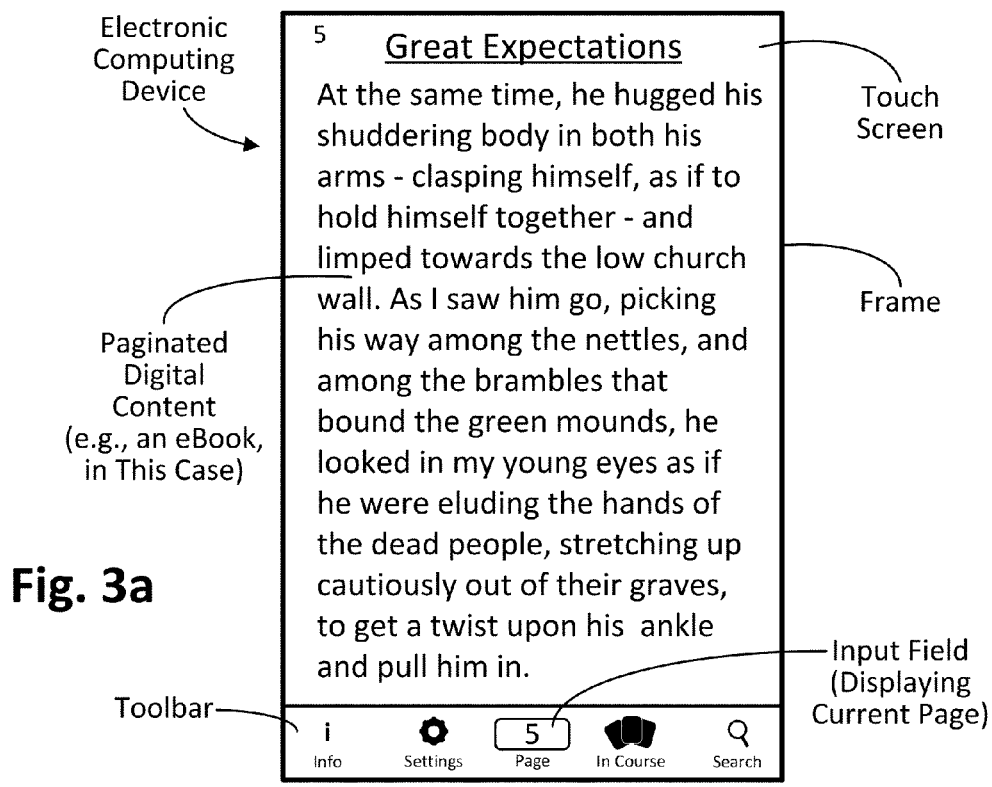
FIGS. 3a-j collectively illustrate an example go-to mode for an electronic computing device, in accordance with one or more embodiments of the present invention.

FIGS. 3a-j collectively illustrate an example go-to mode for an electronic computing device, configured in accordance with one or more embodiments of the present invention. As can be seen in FIG. 3a, the electronic computing device is shown having a housing/frame that includes a touch screen for displaying content and allowing user input (whether direct or proximate). The touch screen in FIG. 3a is displaying a page of an eBook, and more specifically, page 5 of the eBook "Great Expectations." The eBook may be displayed or otherwise presented using an eReader application, or some other suitable application or program. Although the go-to mode is being illustrated in FIGS. 3a-j on a touch-sensitive device having a touch screen, other touch-sensitive devices may include a non-touch display screen that can be used in conjunction with a touch-sensitive surface/interface, such as a track pad, as previously described. As was also previously described, the go-to mode may be used on a non-touch-sensitive computing device; however, a touch-sensitive computing device is used herein for ease of description.

Figure 3B:
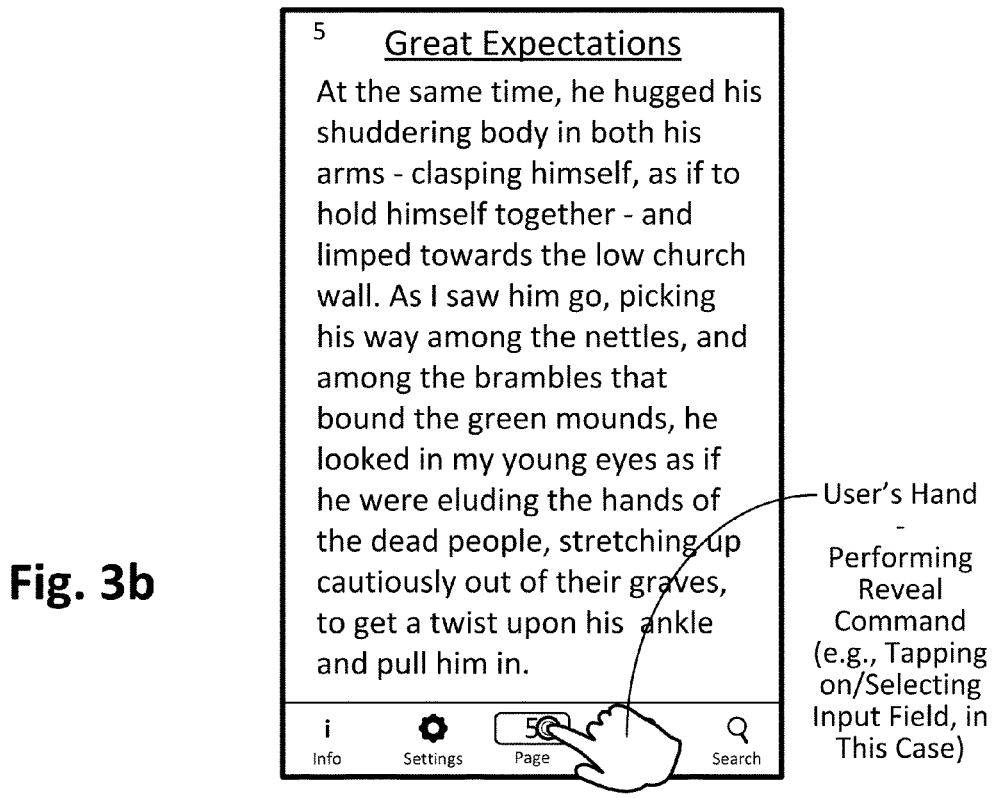

As can also be seen in FIG. 3a, a toolbar is displayed at the bottom of the screen, in this example screen shot. The toolbar includes selectable options related to info, settings, page, in course, and search. The page portion of the toolbar includes a go-to mode input field which is displaying the current page (e.g., page 5 in this example case). The input field in this example embodiment is presenting/displaying the current page and allows for user input that can be used to navigate to a desired page, as will be discussed herein. FIG. 3b shows a user performing an example reveal command to invoke the go-to mode and/or cause the go-to mode custom keypad to be presented/displayed. Remember, the keypad is referred to as a custom keypad herein, since the go-to mode may be configured to disable one or more keys on the custom keypad when selection of such keys would result in an invalid input in the input field. In this example case, the user is tapping on (or selecting) the go-to mode input field as can be seen (e.g., using a hand, and more specifically a finger, to contact the touch screen at the input field location, in this example case) to perform the reveal command. Note that other suitable reveal commands will be apparent in light of this disclosure. Also note that in some embodiments, the go-to mode may be invoked prior to performing a reveal command (such that the revel command causes a custom keypad to be presented as will be discussed with reference to FIG. 3c), while in other embodiments, the reveal command may invoke the go-to mode and cause the custom keypad to be presented using the same input. In yet other embodiments, the go-to mode may need to be invoked prior to performing a reveal command used to present the custom keypad.

Figure 3C:
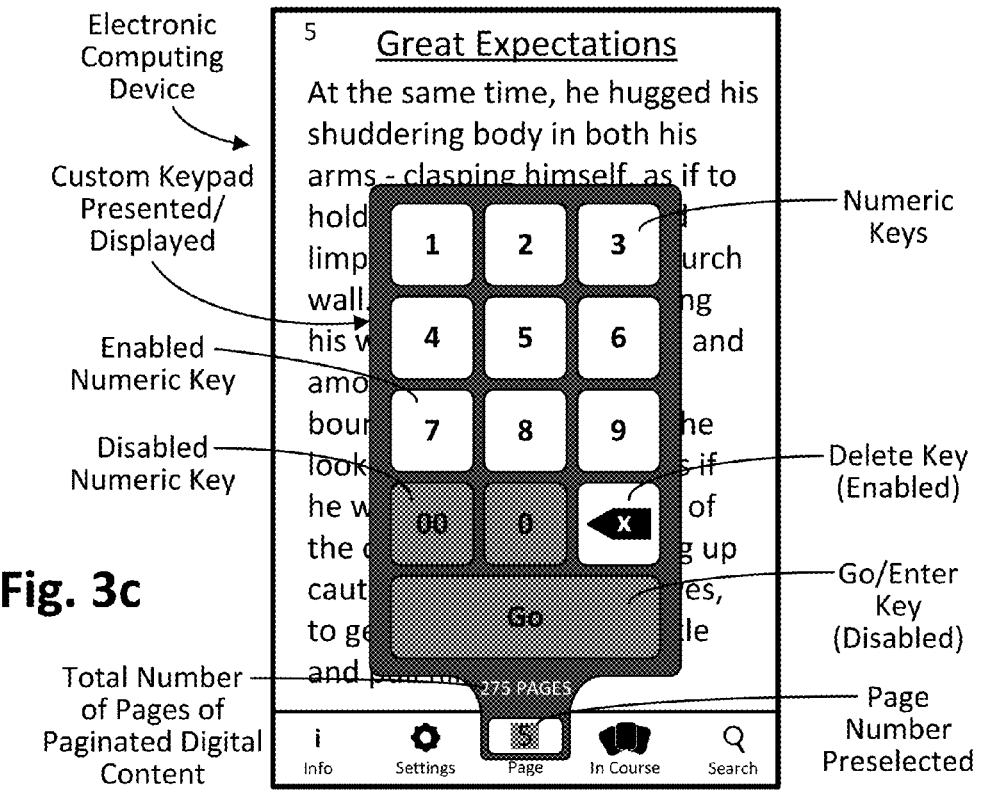

FIG. 3c shows a screen shot illustrating the result of the reveal command performed in the example case shown in FIG. 3b. As can be seen in FIG. 3c, a go-to mode custom keypad has been presented/displayed in response to the reveal command. The custom keypad in this example embodiment includes multiple numeric keys (e.g., keys 0 through 9 and 00, in this example case), as well as a delete key and a go/enter key. These keys can be tapped on (or otherwise selected) to provide input to the input field as will be apparent in light of this disclosure. The total number of pages of the paginated digital content is also presented above the input field to help indicate such information to the user; however, such information need not be presented. In this example embodiment, the page number entry that was displayed in the input field (e.g., the current page number "5," in this example case) is preselected in response to the user performing the reveal command, as shown in FIG. 3c. As previously described, in some configurations, the entry that was in the input field may be appended (e.g., where an input cursor starts at the end of the entry) in response to a reveal command, while in other configurations, the entry may be prepended (e.g., where an input cursor starts at the beginning of the entry) or have some other suitable configuration.

FIG. 3c also shows that some of the keys of the custom keypad are disabled (e.g., the keys are darker to indicate they are disabled, in this example case). In this example embodiment, the go-to mode is configured to disable numeric keys when selection of such numeric keys would result in an invalid page number input in the input field based on the total number of pages of the paginated digital content. Since the entry in the input field (page 5, in this example case) has been preselected, the 0 and 00 keys have been disabled, since entry of those numbers would result in an invalid page number input into the input field (since the go-to mode does not allow leading zeroes, in this example case). However, since the total number of pages in the presented eBook is 275, all of the other numeric keys are enabled, since they all would allow proper input into the input field. Note that the go/enter key is disabled, because the go-to mode (in this example case) is configured to allow a user to navigate to an input page only when the input page is different than one of the currently presented pages; however, that need not be the case in other embodiments. Also note that the delete key is enabled in this example case, since the input field entry is selected such that selection of the delete key would case the input field entry to be deleted. In some embodiments, the delete key may be disabled when selection of the key would not cause any entry in the input field to be deleted, as will be discussed herein.

Figure 3D:
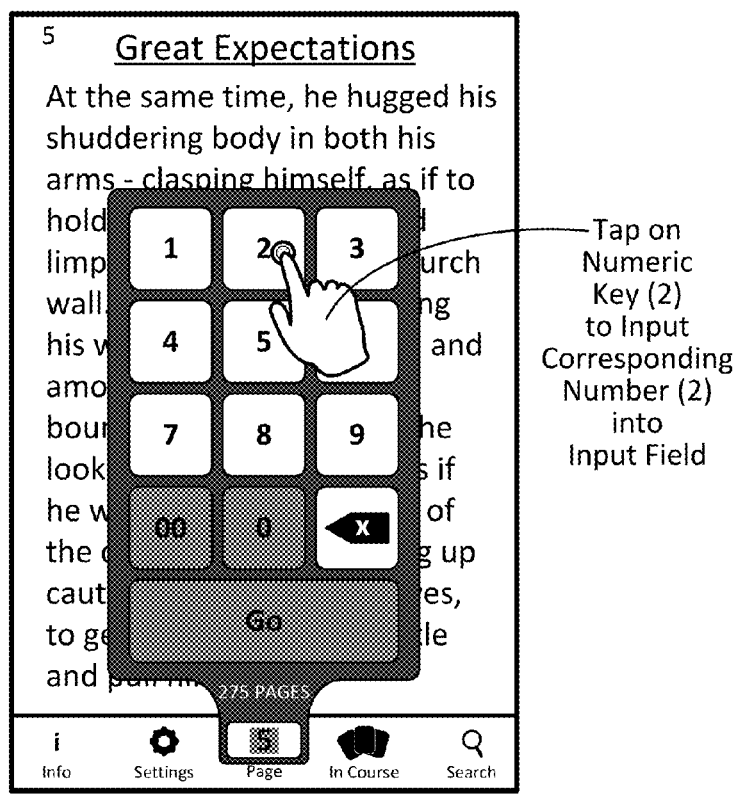
Figure 3E:
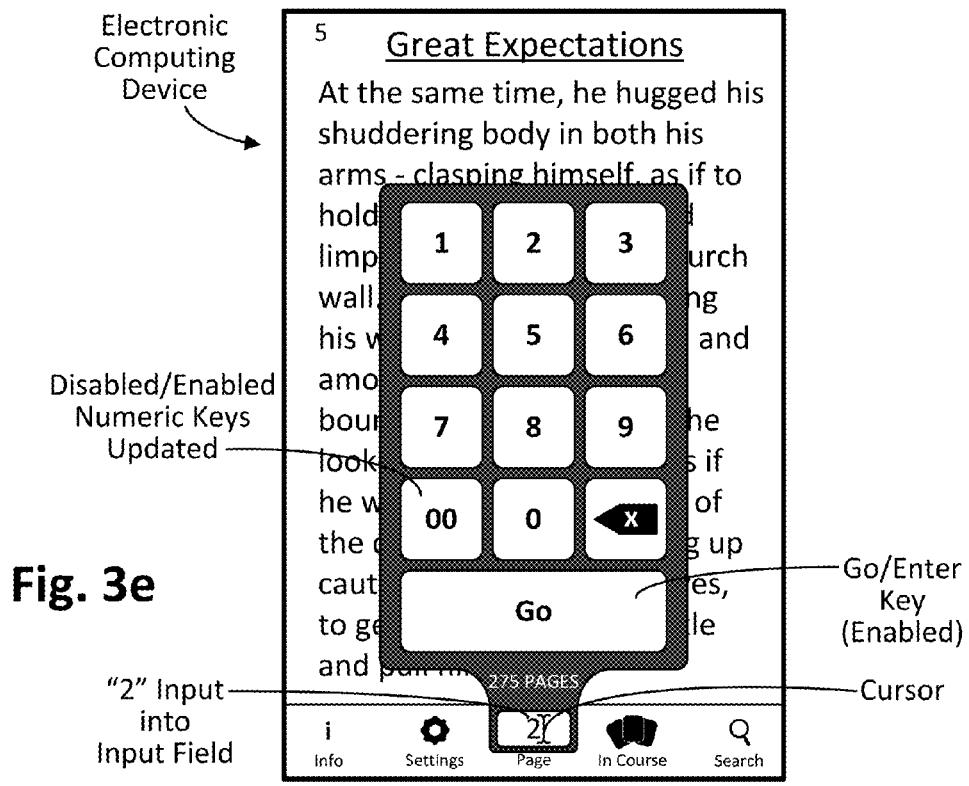

FIG. 3d illustrates the user tapping on (or selecting) a numeric key (e.g., key 2, in this example case) to input the corresponding number into the input field. FIG. 3e shows the result of the input performed in FIG. 3d, and as can be seen, the number "2" has replaced the previously selected entry in the input field. As can also be seen, a cursor has automatically been presented after the "2" input to indicate the position in the input field that will respond to input from the custom keypad. Note that all of the keys on the custom keypad are now enabled (in other words, no keys are disabled) in response to the input of "2" in the input field. This is because the selection of any of the keys would result in a valid input or action. For example, the selection of any of keys 0 through 9 would result in proper page inputs of 20 through 29 to be input into the input field. In addition, the selection of key 00 would result in the proper page input of 200 to be input into the input field. Further, the selection of the delete key would result in deletion of the "2" input (since the cursor is to the right of the input) and the selection of the go/enter key would result in navigating to page 2 of the eBook to cause page 2 to be presented/displayed. Note that in some embodiments, selection of the go/enter key may result in exiting the go-to mode and/or may cause the custom keypad to no longer be presented (e.g., so that the user can view/consume the page that was just navigated to). Also note that the total number of pages of the paginated digital content may be provided by the content itself and/or determined by the go-to mode using any suitable customary process.

Figure 3F:
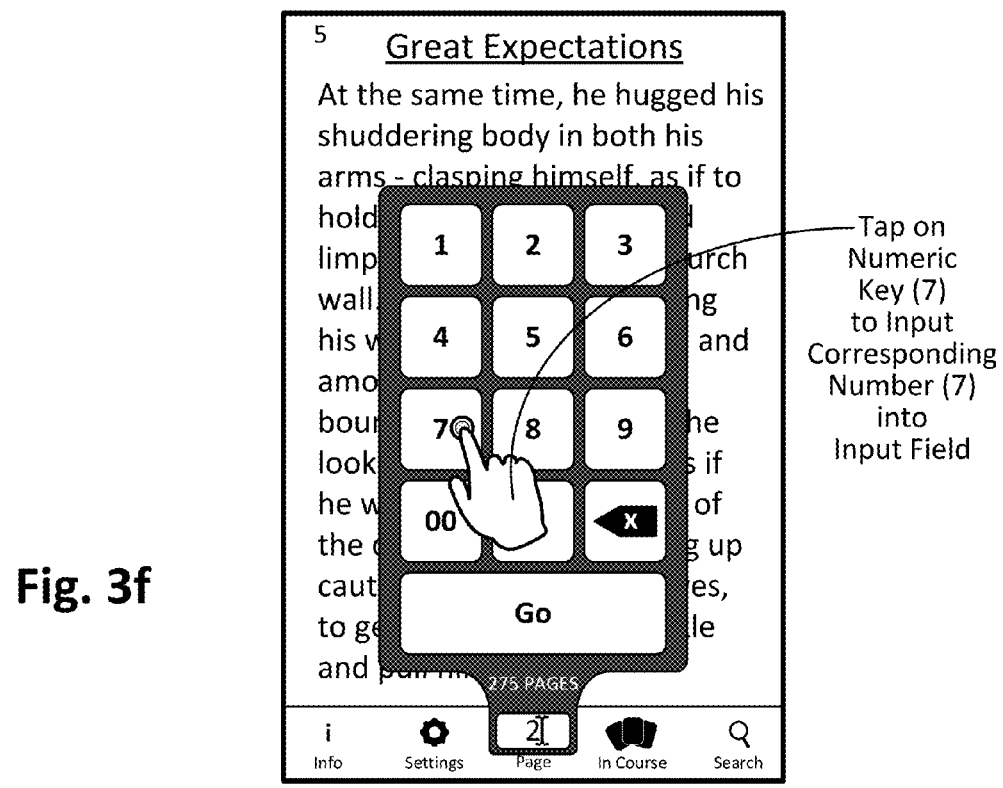
Figure 3G:
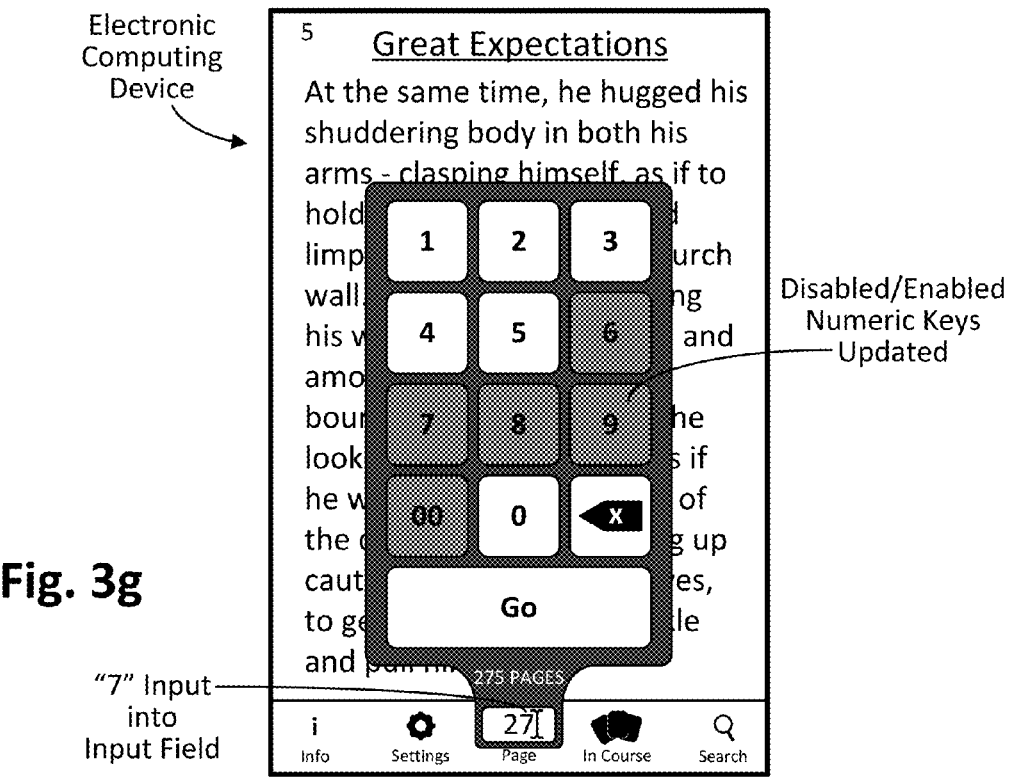

FIG. 3f illustrates the user tapping on (or selecting) a numeric key (e.g., key 7, in this example case) to input the corresponding number into the input field at the cursor location. FIG. 3g shows the result of the input performed in FIG. 3f, and as can be seen, the number "7" has been input to the right of the number "2" to cause an input of "27." As can also be seen, multiple numeric keys have been disabled in response to the new input. In this example case, numeric keys 6 through 9 and 00 have been disabled, since selection of one of the keys would result in an invalid page input into the input field based on the total amount of pages of the eBook. For example, since the total number of pages of the eBook is 275 pages, the selection of any of keys 6 through 9 would result in invalid page inputs of 276 through 279 (all of which exceed 275). In addition, the selection of key 00 would result in an invalid input of 2700 (which exceeds 275). Thus, the go-to mode disables keys if selection of one of such keys would result in an invalid input to, for example, prevent the user from inputting an invalid page number. As will be apparent in light of this disclosure, in some embodiments, the go-to mode may be configured to update which numeric keys are disabled and/or enabled when the cursor position in the input field is changed, contents in the input field are selected, or a number is input into (or deleted from) the input field. In some such embodiments, all keys may be enabled by default, and the go-to mode may therefore determine which keys (if any) to disable.

Figure 3H:
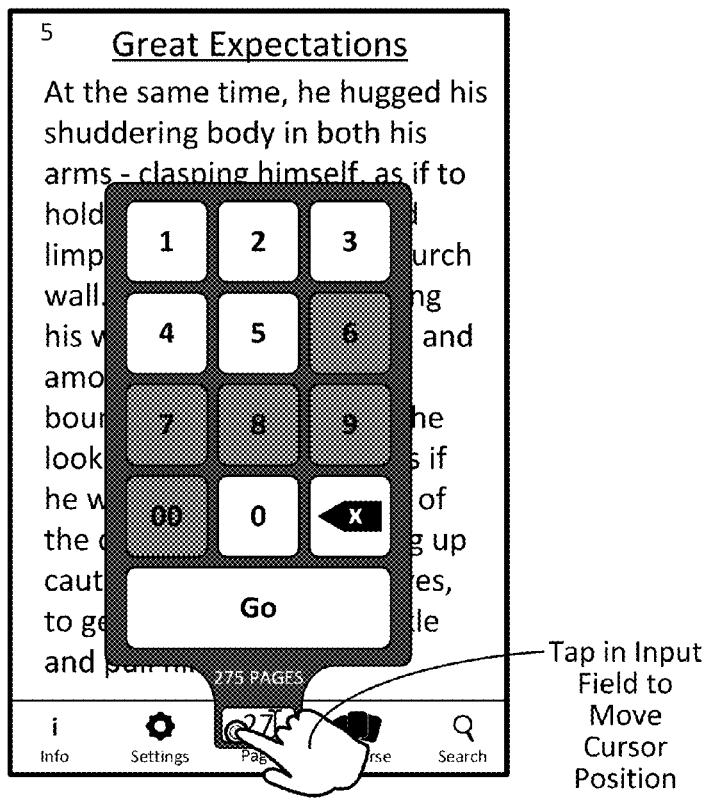
Figure 3I:
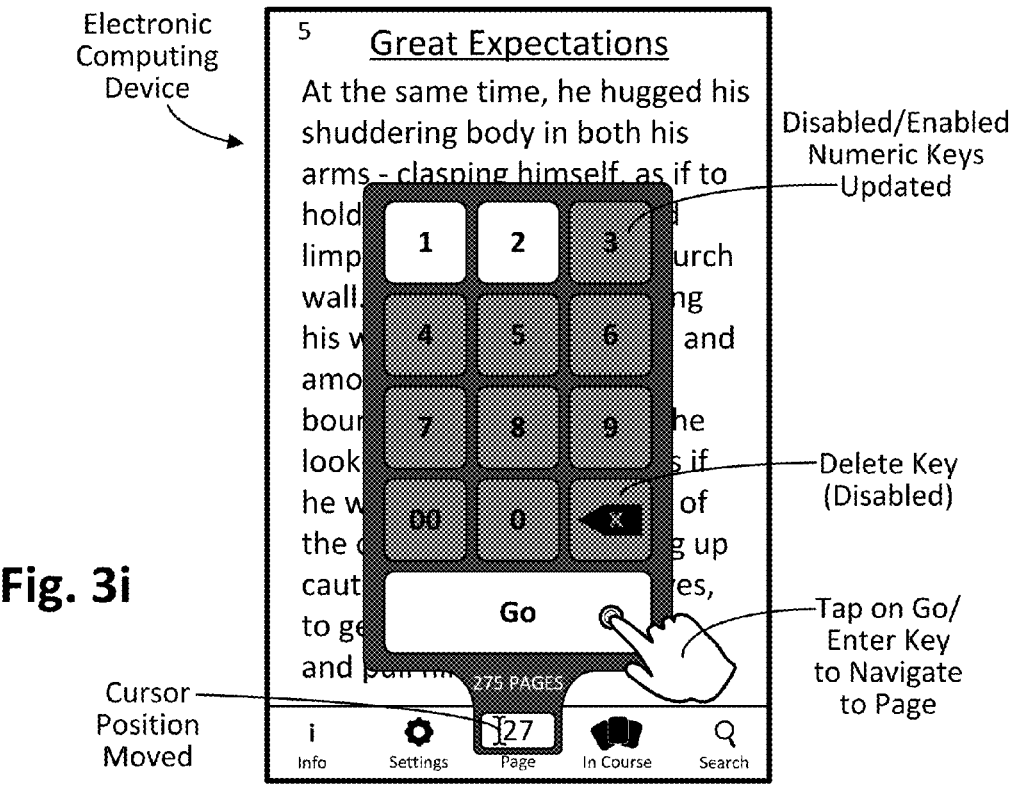

FIG. 3h illustrates the user tapping in (or selecting in) the input field to move the cursor position from the end of the "27" input to the beginning of the input. FIG. 3i shows the result of moving the cursor position, and as can be seen, the cursor has been moved to the beginning of the input. As can also be seen, multiple keys have been disabled in response to moving the cursor position. In this example case, numeric keys 3 through 0, key 00, and the delete key have been disabled, since selection of one of the keys would result in an invalid input in the input field based on the cursor position and the total number of pages of the eBook. For example, since the total number of pages of the eBook is 275, the selection of any of keys 3 through 0 would result in invalid page inputs of 327, 427, . . . 027 (which exceed 275 or result in an improper leading zero). In addition, the cursor is positioned at the beginning of the input (or at the leftmost position, in this example case), therefore, selection of the delete key would not cause any deletion to occur and thus the delete key has been disabled (since the delete key is configured in this example embodiment to delete characters to the left of the cursor or to delete selected content in the input field).

Figure 3J:
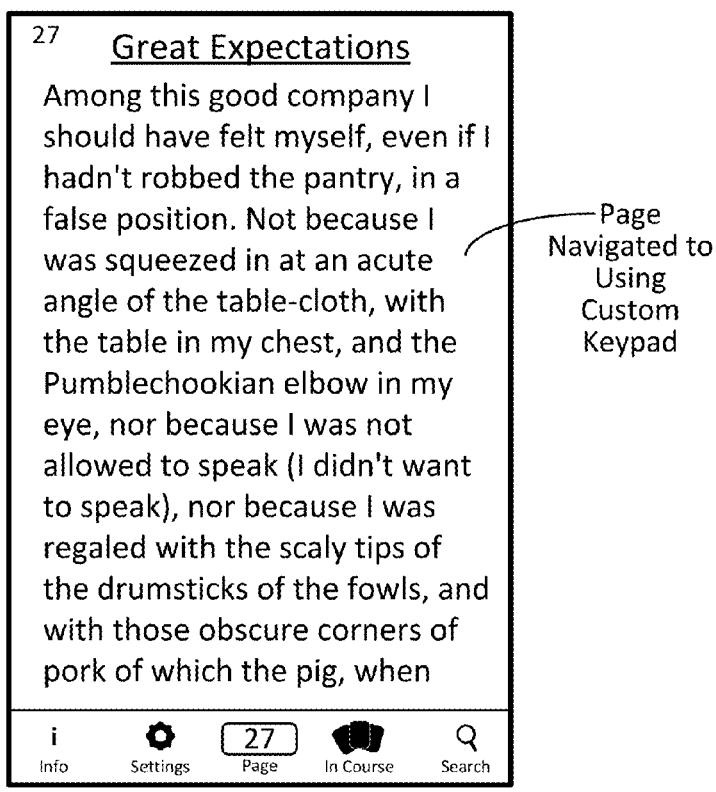

FIG. 3i also shows the user tapping on (or selecting) the go/enter key to navigate to the page input into the input field. FIG. 3j shows the result of selecting the go/enter key. More specifically, FIG. 3j shows page 27 of the eBook after it has been navigated to using the go-to mode custom keypad. Note that the custom keypad has been hidden (or is otherwise no longer being presented/displayed) in response to navigating to the previously input page. Also note that the current page has ("27") been updated in the input field, allowing the user to navigate to another page by performing the process described with reference to FIGS. 3b-i. FIGS. 3i-j illustrate one way of exiting the go-to mode and/or hiding the go-to mode custom keypad (or otherwise causing the custom keypad to no longer be presented/displayed); however, the go-to mode may be exited and/or the custom keypad may be hidden in numerous other ways. For example, the user may be to tap outside of (or otherwise select outside of) the go-to mode custom keypad and input field to return to a currently presented page of the paginated digital content. Another example may include selecting a back, home, or power button. Yet other examples may include providing no input for a period of time or other suitable actions as will be apparent in light of this disclosure.

Figure 4A:
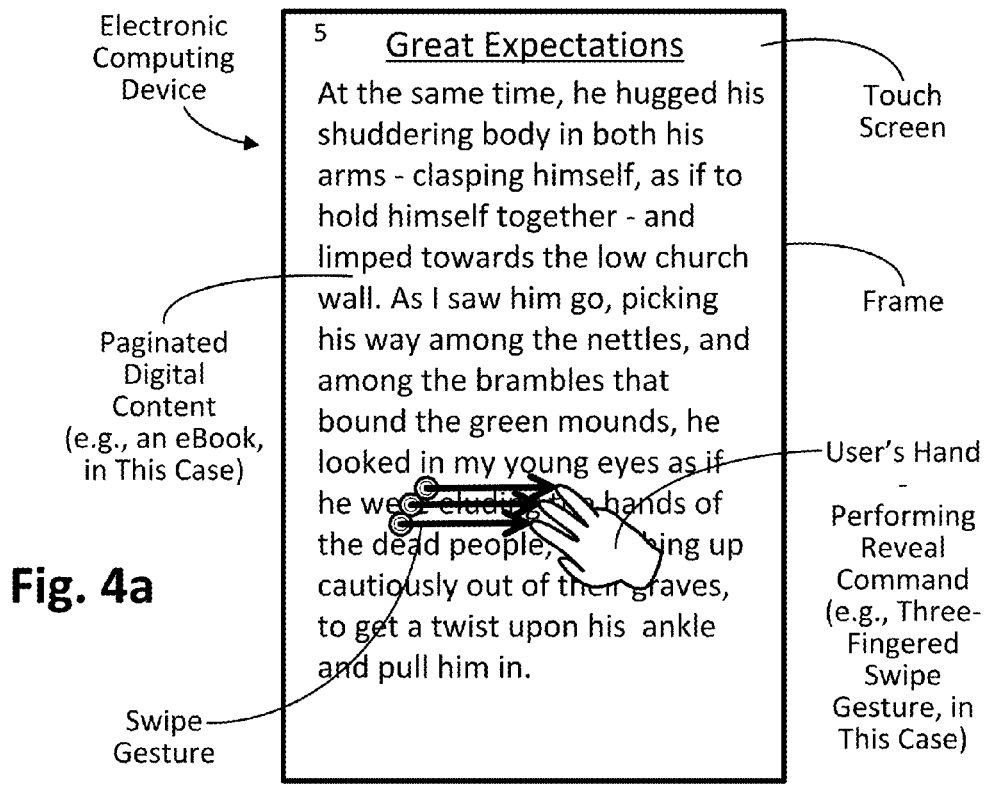
FIGS. 4a-d illustrate example go-to mode alternatives for an electronic computing device, in accordance with one or more embodiments of the present invention.

FIGS. 4a-d illustrate example go-to mode alternatives for an electronic computing device, configured in accordance with one or more embodiments of the present invention. FIG. 4a includes a screen shot of the electronic computing device described with reference to FIG. 3a (e.g., including a frame and touch screen, and displaying page 5 of the eBook "Great Expectations"), except that a toolbar (and thus, a go-to mode input field) is not being displayed in this example embodiment. As can be seen in FIG. 4a, a user is performing an example reveal command to invoke the go-to mode and/or cause the go-to mode custom keypad and input field to be presented/displayed. In this example case, the user is performing a three-fingered swipe gesture as can be seen (e.g., using a hand, and more specifically, three fingers to contact the touch screen and then swipe or drag from left to right, in this example case) to perform the reveal command.

Figure 4B:
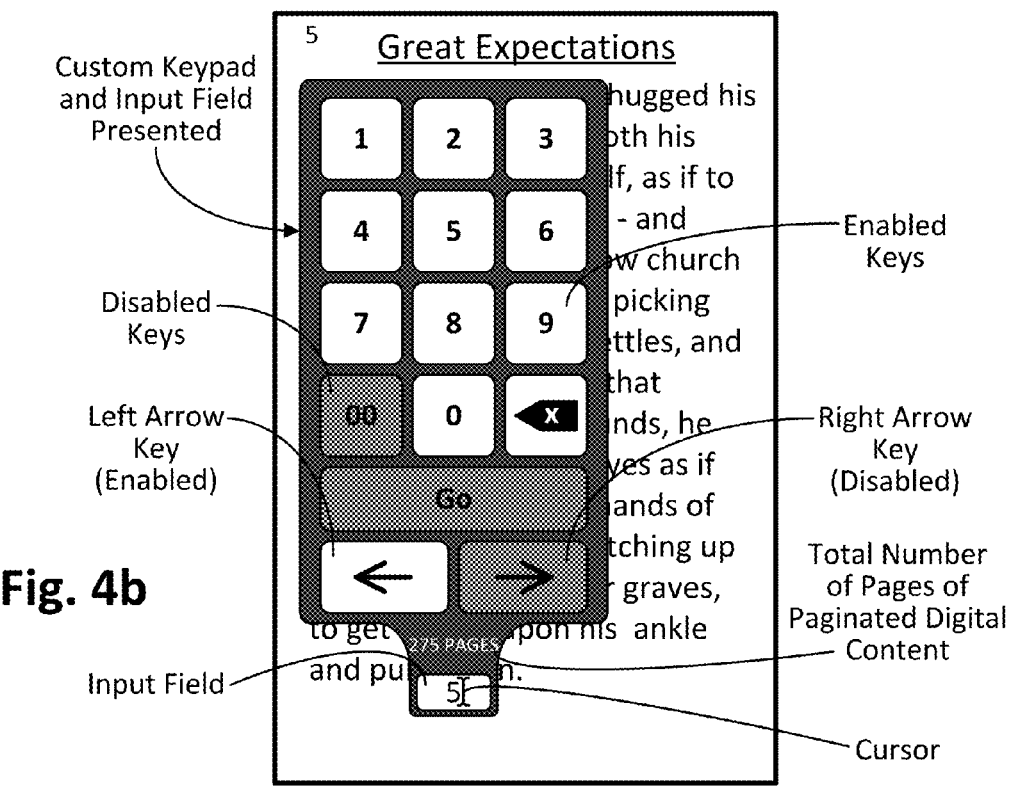

FIG. 4b shows a screen shot illustrating the result of the reveal command performed in the example case shown in FIG. 4a. As can be seen in FIG. 4b, a go-to mode custom keypad and input field has been presented/displayed in response to the reveal command. Note that the input field is presented/displayed simultaneously with the custom keypad. However, in other embodiments, a user may have to perform a first action to cause the input field to be presented (e.g., tap/select on the paginated digital content) and then perform a reveal command to cause the custom keypad to be presented (e.g., tap/select in the input field). The custom keypad in this example embodiment includes multiple numeric keys (e.g., keys 0 through 9 and 00, in this example case), as well as a delete key, a go/enter key, a left arrow key, and a right arrow key. These keys can be tapped on (or otherwise selected) to provide input to the input field as previously described. In this example embodiment, the page number entry that was displayed in the input field (e.g., the current page number "5," in this example case) is appended in response to the user performing the reveal command, as shown in FIG. 4b, resulting in the cursor being positioned at the end of the entry.

As can also be seen in FIG. 4b, the 00 key is disabled, because selection of this key would result in an invalid page input of 500 into the into field (since 500 exceeds the total number of pages of 275). For completeness of description, keys 0 through 9 are enabled, since selection of one of those keys would result in a valid input of 50 through 59, respectively. In addition, the custom keypad includes a left arrow key and a right arrow key that may be used to move the cursor position in the input field. The left arrow key is shown as enabled in this example case, since selection of the left arrow key would result in the cursor moving one position to the left. The right arrow key is shown as disabled in this example case, since selection of the right arrow key would result in an invalid input trying to move the cursor to the right (when it is already at the end of the input).

Figure 4C:
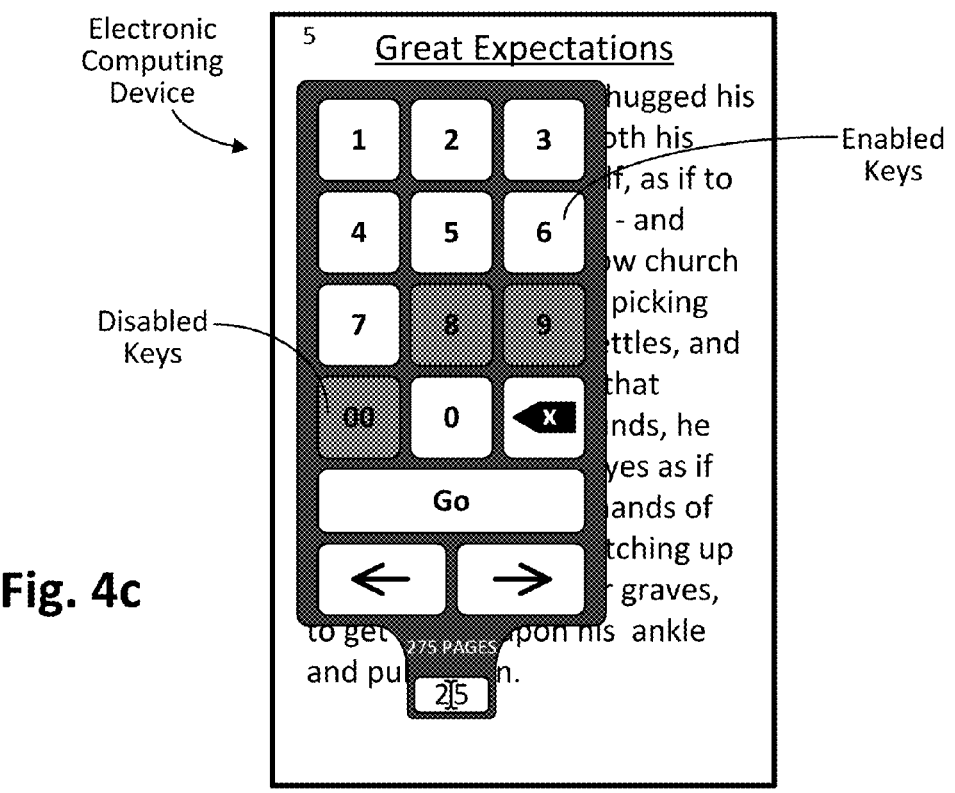
Figure 4D:
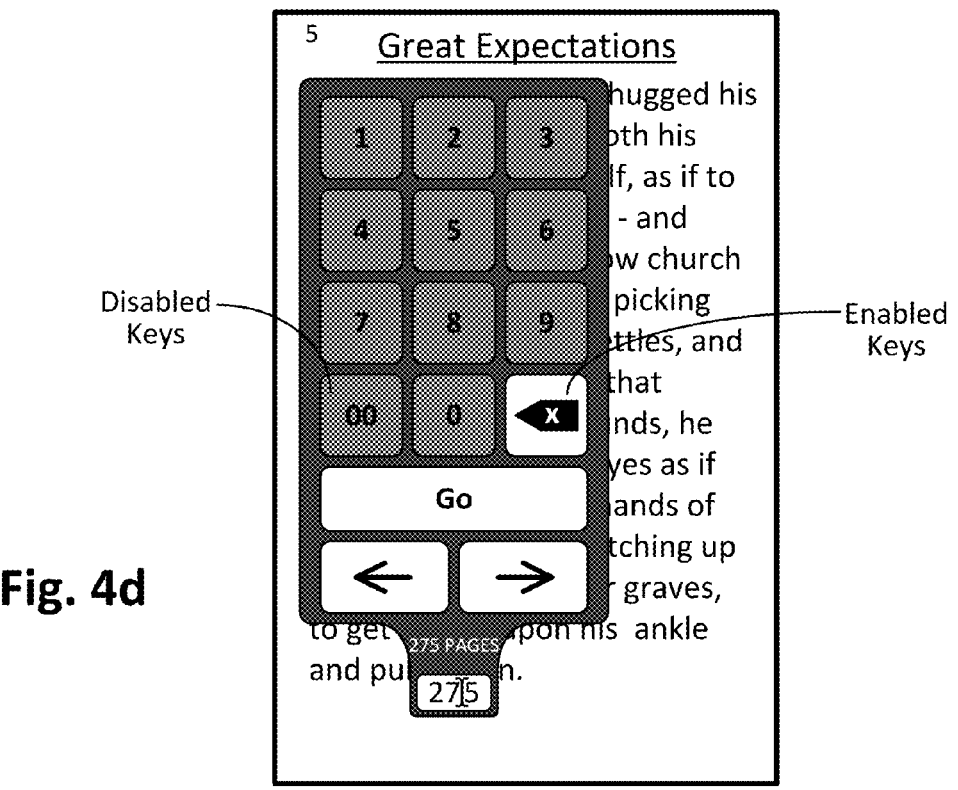

FIGS. 4c and 4d show additional example cases of which custom keypad keys are enabled and disabled based on the input in the input field, to further illustrate the go-to mode in accordance with an embodiment. As can be seen in FIG. 4c, keys 8, 9, and 00 are disabled, since they would result in invalid input of 285, 295, and 2005, respectively (all of which are in excess of 275). In addition, both the left and right arrow keys are enabled, since the cursor is positioned between two numbers. Further, the delete and go/enter keys are enabled since they can be selected to delete the "2" input or navigate to page 25, respectively, in this example case. As can be seen in FIG. 4d, all of the numeric keys are disabled, since they would result in invalid input (since the maximum page number of "275" is already input in the input field). In this example case, the user can either delete one or more input numbers (including moving the cursor by tapping to the desired cursor position or using the left/right arrow keys), navigate to page 275 by tapping on (or otherwise selecting) the go/enter key, or perform some other action to exit the mode and/or hide the custom keypad and input field (e.g., tap outside of the custom keypad and input field to return to page 5 of the eBook). Note that the go-to mode custom keypad and input field examples shown in FIGS. 3a-j and 4b are provided for illustrative purposes, and are not intended to limit the present invention. Numerous variations and configurations will be apparent in light of this disclosure.

Methodology

Figure 5:
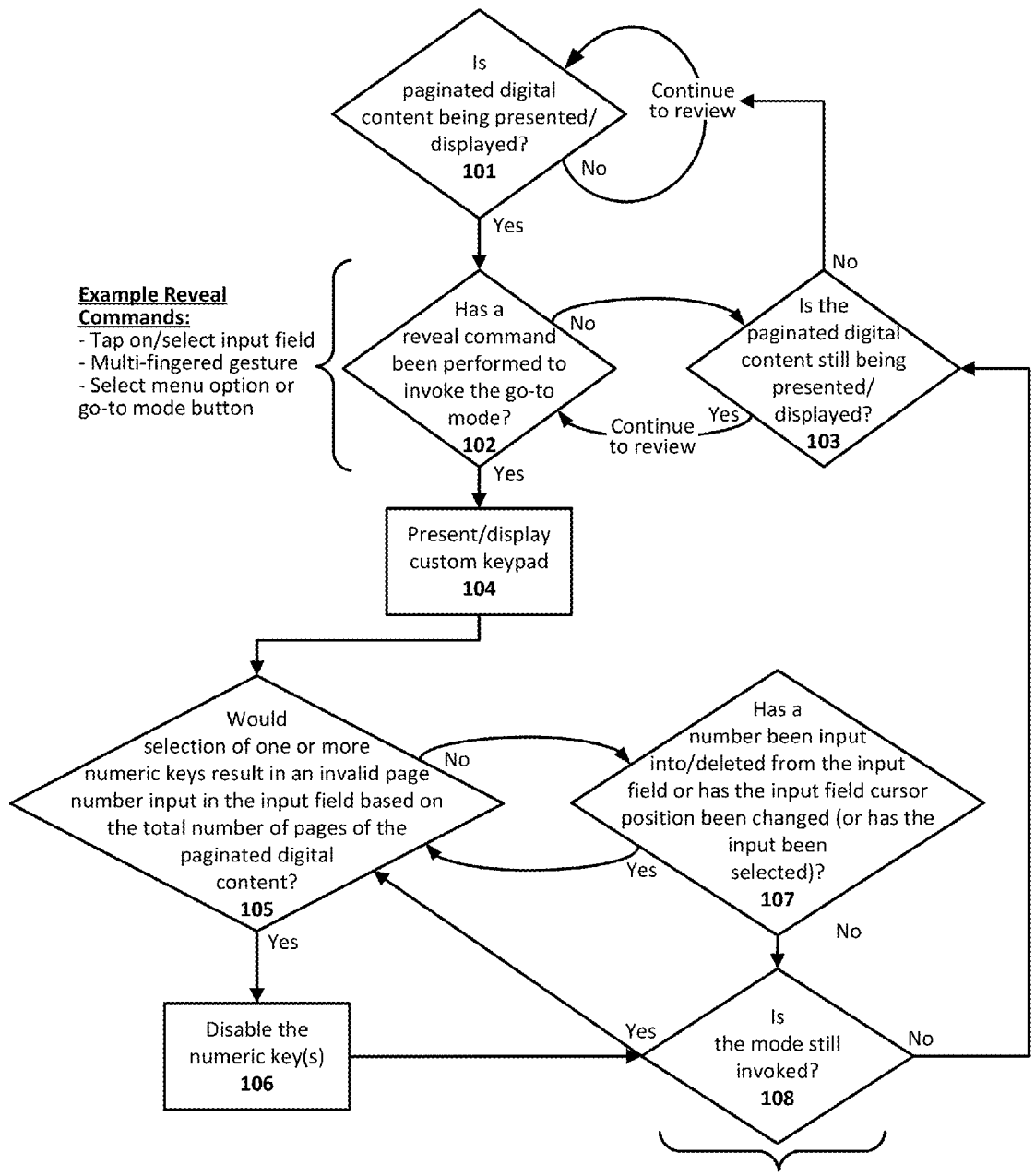
FIG. 5 illustrates a method for providing a go-to mode in an electronic computing device, in accordance with one or more embodiments of the present invention.

FIG. 5 illustrates a method for providing a go-to mode in an electronic computing device, in accordance with one or more embodiments of the present invention. The example methodology may be implemented, for instance, by the UI module of the example electronic computing device shown in FIG. 2a, or the example electronic computing device shown in FIG. 2b (e.g., with the UI provisioned to the client by the server). To this end, the UI may be implemented in software, hardware, firmware, or any suitable combination thereof, as will be appreciated in light of this disclosure. In computing devices including a touch screen or other touch-sensitive interface, the computing device may be able to detect contact, whether direct or proximate (e.g., via hovering input), which can be used in various ways to implement UI functionality, including performing a reveal command, selecting keys from the custom keypad, or other input as variously described herein.

In the example case illustrated in FIG. 5 the method starts by determining 101 if paginated digital content (or similarly divided digital content) is being presented/displayed. The paginated digital content may be presented/displayed using any appropriate application or program, such as an eReader application, an office application (e.g., document viewing application), a magazine/catalog reader application, or any other suitable application or program. If paginated digital content is not being displayed (or otherwise presented), the method continues to review until such content is displayed. Once paginated digital content is being displayed, the method continues by determining 102 if a reveal command has been performed to invoke the go-to mode. In some embodiments, the mode may need to be enabled prior to being invoked, as previously described. For example, the mode may be enabled from a configuration/settings menu or it may be enabled when a specific application or program is running. In some embodiments, the go-to mode may be tied to one or more applications capable of presenting/displaying paginated digital content and the tool may not be available/enabled until one such application is running, active, and/or displayed (which may result in a conservation of device power and/or memory).

If the mode is not invoked, then the method continues by reviewing 103 if the paginated digital content is still being displayed. If the content is not still being displayed, the method continues back at diamond 101 to review if paginated digital content is being displayed. If the paginated digital content is still being displayed, the method continues to review until either the mode is invoked or until the paginated digital content is no longer being displayed. The mode may be invoked using various suitable reveal commands. Example reveal commands include tapping on/selecting the go-to mode input field (e.g., as shown in FIG. 3b), performing a multi-fingered gesture (e.g., as shown in FIG. 4a), selecting a menu option or go-to mode button to invoke the mode, or any other suitable input as will be apparent in light of this disclosure. In some embodiments, the go-to mode may be invoked by only one reveal command or by multiple reveal commands. Such commands may be hard-coded, user-configurable, or some combination thereof (e.g., where a default reveal command(s) can be used but a user-selected reveal command(s) can also be used). Remember, paginated digital content as used herein includes content that is divided in an organized manner. For example, a gallery application configured to present/display discrete photographs may be considered paginated digital content and may therefore benefit from the go-to mode as variously described herein.

Once the go-to mode has been invoked (e.g., in response to a user performing a suitable reveal command), the method continues by presenting/displaying 104 the go-to mode custom keypad. After (or at the same time as) the custom keypad is presented/displayed, the method continues by determining 105 if the selection of one or more of the numeric keys on the custom keypad would result in an invalid page number input in the go-to mode input field. In some embodiments, such a determination may be made based on the total number of pages (or other similar divisions) of the paginated digital content. If selection of one or more numeric keys would result in an invalid page number input in the input field, the method continues by disabling 106 the numeric key(s). Which keys are disabled may be determined one key at a time or simultaneously, depending upon the go-to mode configuration. If selection of any of the enabled numeric keys would not result in an invalid page number being input in the input field, the method continues by determining 107 if a number has been input into (or deleted from) the input field or if the input field cursor position has been changed (or if the input number(s) in the input field have been selected). If one of those actions has been performed, the method continues back at diamond 105 to determine if the disabled (and the enabled) keys on the custom keypad need to be updated.

If none of the actions from diamond 107 have been performed (e.g., input/delete number from input field or change cursor position/select input field input), the method continues by determining 108 if the go-to mode is still invoked. If the mode is still invoked, the method continues at diamond 105 and continues to review if any keys need to be updated (e.g., enabled or disabled). Although FIG. 5 illustrates a method for disabling and enabling numeric keys, the method can be applied, in other embodiments, to other keys, such as the enter key and delete key (as variously discussed herein). Continuing from diamond 108, if the mode is no longer invoked, the method continues back at diamond 103 to determine if the paginated digital content is still being presented/displayed. Example actions that may exit the go-to mode include tapping on or selecting the custom keypad enter key (or performing some other input to confirm entry of the input number in the input field to navigate to the corresponding page), tapping on or selecting outside of the custom keypad and input field (e.g., to return to the currently presented page), or hitting the home or power button of the computing device, just to name a few examples.

Numerous variations and embodiments will be apparent in light of this disclosure. One example embodiment of the present invention provides an electronic device comprising a display for presenting paginated digital content to a user, and a user interface including a go-to mode that includes an input field and a keypad comprising numeric keys that allow for input of a target page number of the digital content, wherein the keypad is presented in response to a reveal command. In some cases, the go-to mode is configured to disable one or more of the numeric keys when selection of such numeric keys would result in an invalid page number input in the input field based on a total number of pages of the paginated digital content. In some such cases, the go-to mode dynamically updates which numeric keys are disabled as input in the input field changes. In some cases, the reveal command comprises tapping or selecting the input field to cause the keypad to be presented. In some such cases, any existing page number in the input field is preselected in response to tapping or selecting the input field so as to allow for its replacement in response to new input via the keypad. In some cases, the keypad and the input field are simultaneously presented in response to a single reveal command. In some cases, the go-to mode is further configured to present, adjacent to the input field, the total number of pages of the paginated digital content. In some cases, the keypad further comprises a delete key configured to delete a number in the input field, the delete key further configured to be disabled when no numbers are left in the input field. In some cases, the keypad further comprises an enter key configured to cause navigation to the page number in the input field when selected, the enter key further configured to be disabled when the page number in the input field is a currently presented page of the paginated digital content. In some cases, the keypad further comprises left and right arrow keys that can be selected to cause lateral cursor movement in the input field. In some cases the keypad comprises numeric keys 0 through 9 and further comprises numeric key 00. In some cases, the go-to mode is integrated within an eReader application. In some cases, the go-to mode is user-configurable.

Another example embodiment of the present invention provides a mobile computing device comprising a processor, a touch screen display for displaying paginated digital content to a user and allowing user input (the paginated digital content having a total number of pages), and a user interface executable by the processor and including a go-to mode. The go-to mode includes a keypad comprising numeric keys 0 through 9, wherein the keypad is presented in response to tapping or selecting a page number input field and wherein the go-to mode is configured to disable one or more numeric keys when selection of one of such numeric keys would result in a page number input that exceeds the total number of pages of the paginated digital content. The keypad further comprises a delete key that deletes a number to the left of a cursor in the input field when selected and an enter key that navigates to the page number in the input field when selected. In some cases, the go-to mode updates which keys are disabled and/or enabled when a cursor position in the input field is changed, contents in the input field are selected, or a number is input into or deleted from the input field.

Another example embodiment of the present invention provides a computer program product comprising a plurality of instructions non-transiently encoded thereon that when executed by one or more processors cause a process to be carried out. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to, in response to a reveal command performed while at least one page of paginated digital content is presented, invoke a go-to mode configured to present a keypad comprising numeric keys (wherein the go-to mode includes an input field). The process is also configured to, in response to entry of a target page number of the paginated digital content via the input field using the keypad, navigate to the target page. In some cases, the process is further configured to disable one or more of the numeric keys of the keypad when selection of such numeric keys would result in an invalid page number input in the input field based on a total number of pages of the paginated digital content. In some such cases, the go-to mode updates which numeric keys are disabled when a cursor position in the input field is changed, contents in the input field are selected, or a number is input into or deleted from the input field. In some cases, the reveal command comprises tapping or selecting the input field to cause the keypad to be presented. In some cases, the keypad further comprises a delete key that deletes a number to the left of a cursor in the input field when selected and an enter key that navigates to the page number in the input field when selected.

The foregoing description of the embodiments of the present disclosure have been presented for the purposes of illustration and description. It is not intended to be exhaustive or to limit the disclosure to the precise forms disclosed. Many modifications and variations are possible in light of this disclosure. It is intended that the scope of the present invention be limited not by this detailed description, but rather by the claims appended hereto.

What is claimed is:

1. An electronic device comprising:
    an electronic display for presenting paginated digital content to a user, the paginated digital content having a total number of pages;
    a processor; and
    a user interface executable by the processor and comprising a go-to mode that includes an input field and a keypad, the key pad comprising a quantity of numeric keys that allow for input of a target page number of the paginated digital content, wherein the keypad is presented in response to a reveal command;
    wherein one or more of the numeric keys are disabled based on a cursor position in the input field and based on whether a selection of the one or more numeric keys would result in an input page number greater than the total number of pages of the paginated digital content, and in response to a change to the cursor position, the disabling of the one or more numeric keys is updated based on whether the selection of the one or more numeric keys would result in the input page number being greater than the total number of pages of the paginated digital content.

2. The device of claim 1 wherein the input page number within the input field is preselected in response to the reveal command, and wherein the go-to mode is further configured to replace the preselected page number with a new page number in response to a new page number being entered via the keypad, and to disable one or more numeric keys based on each cursor position associated with the new page number entry in the input field.

3. The device of claim 2 wherein the go-to mode dynamically updates which numeric keys are disabled as input in the input field changes.

4. The device of claim 1 wherein the reveal command comprises tapping or selecting the input field to cause the keypad to be presented.

5. The device of claim 4 wherein any existing page number in the input field is preselected in response to tapping or selecting the input field so as to allow for its replacement in response to new input via the keypad.

6. The device of claim 1 wherein the keypad and the input field are simultaneously presented in response to a single reveal command.

7. The device of claim 1 wherein the go-to mode is further configured to present, adjacent to the input field, the total number of pages of the paginated digital content.

8. The device of claim 1 wherein the keypad further comprises a delete key configured to delete a number in the input field, the delete key further configured to be disabled when no numbers are left in the input field.

9. The device of claim 1 wherein the keypad further comprises an enter key, and the enter key is disabled when the input page number in the input field is equal to the page number of a currently presented page of the paginated digital content.

10. The device of claim 1 wherein the keypad further comprises left and right arrow keys that can be selected to cause lateral cursor movement in the input field.

11. The device of claim 1, wherein the keypad comprises numeric keys 0 through 9 and further comprises numeric key 00.

12. The device of claim 1 wherein the go-to mode is integrated within an eReader application.

13. The device of claim 1 wherein the go-to mode is user-configurable.

14. A mobile computing device, comprising:
    a processor;
    a touch screen display for displaying paginated digital content to a user and allowing user input, the paginated digital content having a total number of pages; and
    a user interface executable by the processor and including a go-to mode that includes a keypad, the keypad comprising a quantity of numeric keys that allow for input of a target page number of the paginated digital content, wherein the keypad is presented in response to tapping or selecting a page number in an input field and wherein the go-to mode is configured to disable one or more numeric keys based on a cursor position in the input field and based on whether a selection of one of such numeric keys would result in the target page number being greater than the total number of pages of the paginated digital content, and in response to a change to the cursor position, the disabling of the one or more numeric keys is updated based on whether the selection of the one or more numeric keys would result in the target page number being greater than the total number of pages of the paginated digital content;
    wherein the keypad further comprises a delete key that deletes a number to the left of a cursor in the input field when selected and an enter key that navigates to the target page number in the input field when selected.

15. The device of claim 14 wherein the go-to mode updates which keys are disabled and/or enabled when contents in the input field are selected or a number is input into or deleted from the input field.

16. A non-transitory computer program product comprising a plurality of instructions encoded thereon that when executed by one or more processors cause the following process to be carried out:
    in response to a reveal command performed while at least one page of paginated digital content is presented, invoke a go-to mode configured to present a keypad comprising a plurality of numeric keys, wherein the go-to mode includes an input field;
    in response to entry of a target page number of the paginated digital content via the input field using the keypad, one or more of the numeric keys are disabled based on a cursor position in the input field and based on whether a selection of the one or more numeric keys would result in the target page number greater than a total number of pages of the paginated digital content, and in response to a change to the cursor position, the disabling of the one or more numeric keys is updated based on whether selection of the one or more numeric keys would result in the target page number being greater than the total number of pages of the paginated digital content; and in response to entry of the target page number of the paginated digital content via the input field, navigate to the target page.

17. The computer program product of claim 16, wherein the input page number within the input field is preselected in response to the reveal command, and wherein the go-to mode is further configured to replace the preselected page number with a new page number in response to a new page number being entered via the keypad, and to disable one or more numeric keys based on each cursor position associated with the new page number entry in the input field.

18. The computer program product of claim 17 wherein the go-to mode updates which numeric keys are disabled when contents in the input field are selected or a number is input into or deleted from the input field.

19. The computer program product of claim 16 wherein the keypad further comprises an enter key and the enter key is disabled when the target page number in the input field is equal to the page number of the currently displayed page of the paginated digital content.

20. The computer program product of claim 16 wherein the keypad further comprises a delete key that deletes a number to the left of a cursor in the input field when selected and an enter key that navigates to the page number in the input field when selected.

* * * * *